(12) United States Patent
San-Miguel et al.

(10) Patent No.: US 8,283,271 B2
(45) Date of Patent: Oct. 9, 2012

(54) HIGH STRENGTH PROPPANTS

(75) Inventors: Laurie San-Miguel, Clinton, MA (US);
Kevin R. Dickson, Hudson, OH (US);
Tihana Fuss, Derry, NH (US); Walter T. Stephens, Cleveland, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 286 days.

(21) Appl. No.: 12/262,790

(22) Filed: Oct. 31, 2008

(65) Prior Publication Data
US 2010/0113251 A1    May 6, 2010

(51) Int. Cl.
*C04B 35/00* (2006.01)
(52) U.S. Cl. ......... 501/128; 501/127; 501/153; 501/154
(58) Field of Classification Search ................... 501/126, 501/127, 128, 129, 130, 131, 153, 154
See application file for complete search history.

(56) References Cited

U.S. PATENT DOCUMENTS

| | | | | |
|---|---|---|---|---|
| 4,126,437 A | * | 11/1978 | O'Horo | 65/21.5 |
| 4,555,493 A | * | 11/1985 | Watson et al. | 501/127 |
| 4,639,427 A | * | 1/1987 | Khaund | 501/128 |
| 4,680,230 A | * | 7/1987 | Gibb et al. | 428/403 |
| 4,915,887 A | * | 4/1990 | Day et al. | 501/128 |
| 5,175,133 A | * | 12/1992 | Smith et al. | 501/127 |
| 5,397,759 A | * | 3/1995 | Torobin | 502/415 |
| 2007/0084602 A1 | * | 4/2007 | Curimbaba et al. | 166/280.2 |
| 2008/0070774 A1 | | 3/2008 | Shmotev | |

FOREIGN PATENT DOCUMENTS

| | | |
|---|---|---|
| CN | 1699265 A | 11/2005 |
| KR | 20030010976 | 2/2003 |
| WO | 2006034298 A2 | 3/2006 |

OTHER PUBLICATIONS

International Preliminary Report on Patentability for WO 2010/051481 which is the WO equivalent to the applicant's US application. Dated Aug. 30, 2011.
International Search Report for WO 2010/051481 which is the WO equivalent to the applicant's US application. ISR mailed May 18, 2010.
Written Opinion for WO 2010/051481 which is the WO equivalent to the applicant's US application. Written Opinion mailed May 18, 2010.
Response to Written Opinion for WO 2010/051481 which is the WO equivalent to the applicant's US application. Dated Aug. 25, 2010.

* cited by examiner

*Primary Examiner* — Noah Wiese
(74) *Attorney, Agent, or Firm* — Stewart A. Fraser

(57) ABSTRACT

A sintered ceramic particle made from a ceramic material having a true density greater than 3.5 g/cc and a composition having no more than 30 weight percent silicon oxide and at least 15 weight percent iron oxide, based on the combined weight of the oxides of aluminum, iron and silicon, is disclosed. A process that utilizes an externally applied compressive force to make a ceramic particle is also disclosed.

9 Claims, 3 Drawing Sheets

HIGH STRENGTH PROPPANTS

BACKGROUND OF THE INVENTION

This invention generally relates to ceramic particles for use in a wide variety of industrial applications. Some of these applications include using a plurality of ceramic particles: as a proppant to facilitate the removal of liquids and/or gases from wells that have been drilled into geological formations; as a media for scouring, grinding or polishing; as a bed support media in a chemical reactor; as a heat transfer media; as a filtration media; and as roofing granules when applied to asphalt shingles. More specifically, this invention is useful in applications that require a ceramic sphere that has high crush resistance. Even more specifically, this invention pertains to proppants that may be used in geological formations where the pressure excited on the proppant exceeds the crush resistance of conventional proppants such as sand and resin coated sand.

Examples of patents and published patent applications directed to proppants include: U.S. Pat. No. 3,376,930; U.S. Pat. No. 4,632,876; U.S. Pat. No. 7,067,445; U.S. 2006/0177661 and U.S. 2008/0000638.

SUMMARY

Embodiments of the present invention provide a ceramic particle that is suitable for use in downhole applications that require a high strength proppant.

In one embodiment, the present invention includes a sintered particle comprising ceramic material. The ceramic material comprises oxides of aluminum, iron and silicon. The silicon oxides represent no more than 30 weight percent of the oxides' combined weight. The iron oxides represent between 15 and 40 weight percent of the oxides' combined weight. The density of the ceramic material exceeds 3.5 g/cc.

Another embodiment relates to a process for making a particle comprising a sintered ceramic material. The process may include the following steps. Mixing at least a first metal oxide with one or more dry ingredients and at least one liquid thereby forming a mixture. Forming at least a portion of the mixture into a particle precursor. Sintering the precursor. Heating the precursor and exerting an externally applied compressive force on the precursor thereby forming a sintered ceramic particle.

DETAILED DESCRIPTION

Figure 1:
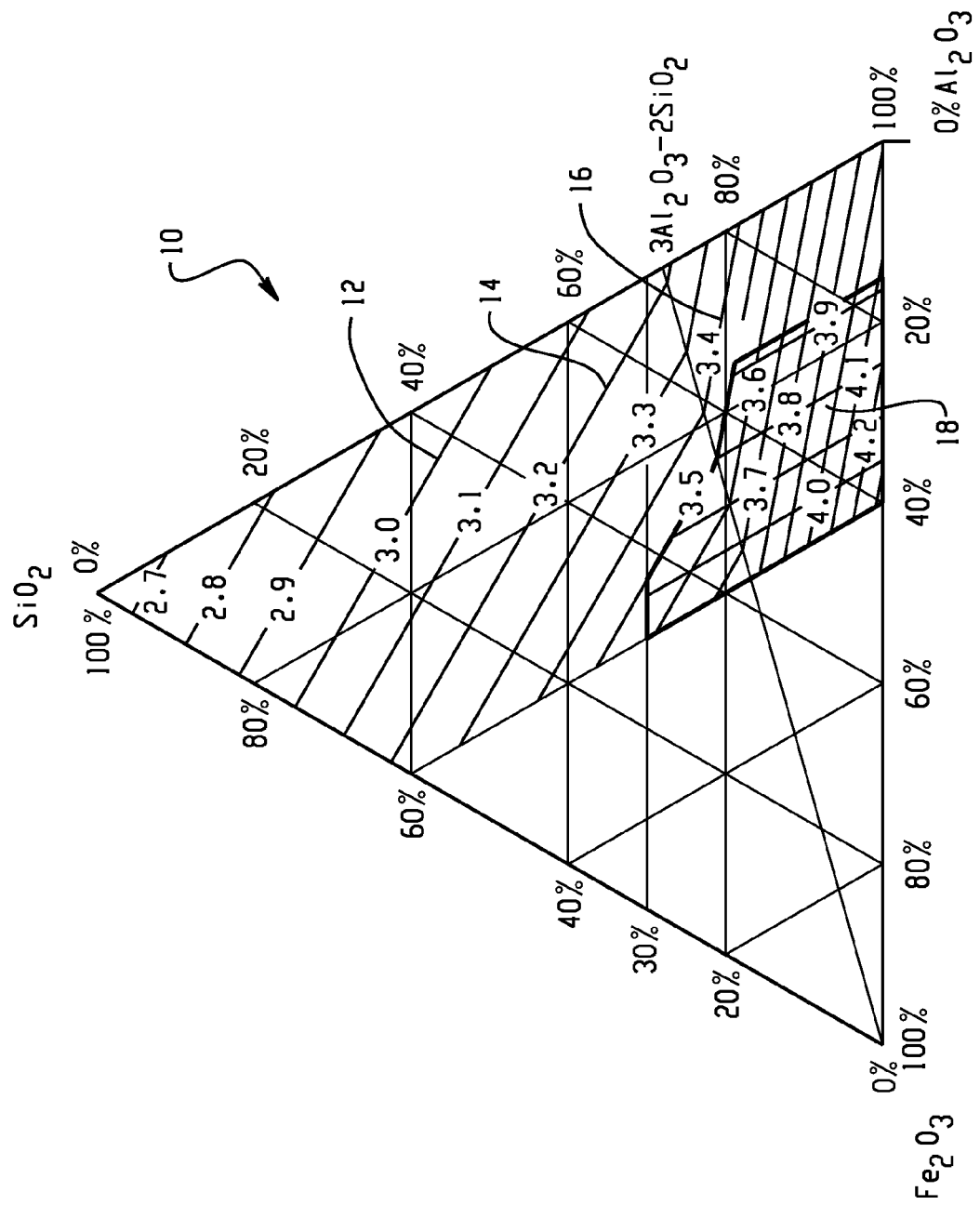
FIG. 1 is a three phase diagram.

Technology that uses particles to facilitate the removal of hydrocarbon based fluids, such as natural gas and crude oil, from downhole well bores has been documented in numerous patents and journal articles. The particles, which may be referred to as proppants, are used to prop open fissures in the earth through which the gas and oil flow toward the well bore. In wells where proppants are not used, the fissures in the earth located closest to the well bore may collapse soon after the gas and oil located closest to the well bore have been removed. The collapse of the fissures limits the production of the well by preventing additional oil and gas from moving toward the well bore. In contrast, the productivity of wells that use proppants may be improved because the proppants prop open the fissures in the earth that would otherwise close after removal of the hydrocarbon based fluids. The proppants are delivered into the fissures by mixing the proppants with a fracturing fluid which is forced through the well bore and into the fissures. When the fracturing fluid is removed, the particles remain lodged in the fissures thereby propping open the fissures.

Due to the ongoing need to provide larger and larger quantities of natural gas and oil and the simultaneous depletion of readily available gas and oil located near the surface of the earth, new wells must be drilled deeper than older wells in order to reach the previously untapped reservoirs of oil and gas. As the depth of the well bore increases, the pressure exerted on the proppant by the earth also increases. Consequently, proppant manufacturers need to produce proppants that can withstand higher pressures than proppants produced a few years ago in order to resist crushing at the deeper well depths. A proppant's ability to withstand crushing may be characterized as crush resistance which is a term commonly used to denote the strength of a proppant and may be determined using ISO 13503-2.2006(E). A strong proppant generates a lower weight percent crush resistance than a weak proppant at the same closure stress. For example, a proppant that has a 2 weight percent crush resistance is considered to be a strong proppant and is preferred to a weak proppant that has a 10 weight percent crush resistance.

Proppants may be made from either a naturally occurring material, such as sand, or from compositions that have been produced via a manufacturing process. An example of a composition used to manufacture proppants is a combination of metal oxides, such as bauxite, that has been mixed with various additives, formed into a plurality of generally spherical balls and then sintered to form a plurality of ceramic proppants. While the exact chemical composition of bauxite may vary depending upon the location of the mine from which the bauxite is removed, most bauxites include between 60 and 90 weight percent $Al_2O_3$. Another example of a composition that may be used to manufacture proppants is commonly known as "red mud" which is a byproduct of the Bayer process for refining aluminum. This waste product typically contains oxidized iron, titanium, sodium, silica and other impurities.

The chemical composition of the bauxite may be determined by preparing a fused sample of the bauxite and then using an X-ray fluorescence (XRF) analytical apparatus to determine the weight percentages of aluminum oxides, iron oxides and silicon oxides. The fused sample may be prepared using a Claisse M4 Fluxer Fusion apparatus (manufactured by Claisse of Quebec City, Canada) as follows. Several grams of the bauxite are manually ground so that the bauxite passes through a 75 μm (200 Tyler mesh) sieve. In a platinum crucible supplied by Claisse, 1.0000 g (±0.0005 g) of the ground and screened bauxite is mixed with 8.0000 g (±0.0005 g) of lithium borates 50-50 which contains a releasing agent such as LiBr or CsI. If the releasing agent is not included in the lithium borate, three drops of a releasing agent (25 w/v % LiBr or CsI) may be added. The mixture in the crucible is then gradually heated in order to remove any organic materials, moisture, etc. Simultaneously, the crucible is rapidly spun so that centrifugal force caused by the spinning drives any entrapped gas from the molten material. When the temperature of the molten bauxite in the crucible reaches approximately 1000° C., the material has been liquefied and the crucible is tilted so that the molten bauxite flows into a disc mold. While the molten material is cooling in the disc mold, a fan blows air on the mold to facilitate the removal of heat. As the molten bauxite cools the material fuses and forms a disc shaped sample that measures approximately 3 cm wide and 4 mm thick. The disc should not contain any gas bubbles trapped therein. The chemical composition of the cooled disc is then determined using a model MagiX Pro Philips X-Ray Fluorescence analyzer running IQ+ software. The same procedure may be used to determine the chemical composition of ceramic particles such as proppants.

One of the criteria considered by proppant manufacturers when selecting a source of bauxite ore used to make proppants is the level of undesirable impurities which are believed to degrade the performance of the proppant. Typical impurities include iron oxide and titanium oxide. Unfortunately, excessive amounts of iron ore may cause problems during the sintering step of the proppant manufacturing process because the sintering temperature of the iron ore may be substantially different than the sintering temperatures of aluminum oxide and aluminum-silicon oxides, such as kaolin clay or mullite. "Sintering", as used herein, means the joining of particles through the application of heat. This commonly results in densification, but not in all cases. Some commercially viable proppant manufacturers have considered sources of bauxite ore that have greater than a 15 weight percent iron oxide to be unsuitable for use as a raw material for the production of proppants. In contrast, this application discloses that a source of bauxite that contains a quantity of a metal oxide previously considered to be unacceptable may be used to manufacture a proppant having improved resistance to crushing. Proppants may be made by selecting a source of bauxite ore that inherently contains: between 50 and 85 weight percent of a first metal oxide, such as oxides of aluminum, which have a density greater than 3.7 g/cc; between 15 to 40 weight percent of a second metal oxide, such as oxides of iron, which have a density greater than 3.9 g/cc; and between 0 and 30 weight percent of a third metal oxide, such as oxides of silicon, which have a density no greater than 2.8 g/cc. Furthermore, a bauxite ore that does not naturally contain a sufficient level of iron oxide may be mixed with a separate source of iron oxide to attain the improved performance in the proppant.

The history of proppant development, as documented in some United States patents, has been inconsistent relative to teaching the best range of specific gravity for proppants. In the 1970s, U.S. Pat. No. 4,068,718, which claims priority of an application filed on May 17, 1974, disclosed a high strength propping agent comprising particles of sintered bauxite having a specific gravity greater than about 3.4." However, during the 1980s, considerable effort was exerted by the proppant industry to produce proppants with specific gravity significantly less than 3.4. For example, U.S. Pat. No. 4,680,230, which was filed on Jan. 18, 1984, quotes a study done for the US Department of Energy which describes an "ideal proppant" as having "a specific gravity less than two". At column 1, lines 49 to 65, this patent teaches away from using sintered bauxite as a proppant. With regard to the use of material containing iron oxide to manufacture ceramic spheroids, such as a proppant that has a high crush strength, U.S. Pat. No. 4,632,876 teaches "However, blast furnace slags, power plant slags and flyash can be used but generally are not acceptable because their high iron oxide contents result in high densities. Iron oxide content of the mineral particulate should be substantially less than 9 weight percent, preferably less than 5%."

In contrast to the patents described above, this invention discloses a proppant wherein the proppant's ceramic material has an iron oxide content substantially higher than previously considered feasible. As used herein, the phrase "ceramic material" refers to the collection of granules of inorganic, metal and non-metal, oxides, carbides and nitrides that have been formed into a sphere and sintered such that the individual granules adhere to one another thereby forming a sintered particle. The ceramic material does not include volatile components, such as binders and liquids used to make the proppant, nor the polymers or other coatings that may be added to the particle after the sintering step. In one embodiment of this invention, the proppant contains at least a first metal oxide that includes oxides of aluminum and a second metal oxide that contains oxides of iron and may include a third metal oxide that contains oxides of silicon. The weight percentages of the first second and third metal oxides are calculated as $Al_2O_3$, $Fe_2O_3$, and $SiO_2$, respectively. The quantity of oxides of iron in the proppant may represent between 15 and 40 weight percent, more preferably between 15 and 35 weight percent, even more preferably between 20 and 30 weight percent, of the oxide's combined weight. The quantity of oxides of silicon may represent between 0 and 30 weight percent, more preferably between 1 and 10 weight percent, of the oxide's combined weight. The weight percentages of the first, second and third metal oxides are calculated as a fraction of the combined weight of just these metal oxides. If the proppant includes other components, such as a polymer coating applied to the surface of the proppant and/or a fourth metal oxide, neither the weight of the polymer nor the fourth metal oxide are included in the calculation of the weight percentages of the first, second and third metal oxides. The combined weight of the metal oxides may exceed 50 weight percent of the ceramic particle's total weight. The total weight of the ceramic particle includes the weight of the first, second and third metal oxides plus the weight of other metal oxides and impurities that remain after the particle has been sintered and prior to the addition of any coatings, fillers, etc. The combined weight of the first, second and third metal oxides may exceed 60 or even 70 weight percent of the ceramic particle's total weight.

In addition to the chemical compositions characteristics described above, the density of the particle's ceramic material exceeds 3.5 g/cc. In some embodiments, the density of the particle's ceramic material may exceed 3.6 g/cc, 4.0 g/cc, 4.2 g/cc or even 4.5 g/cc. As used herein, the phrases "true density", "density of the ceramic material", "density of the particle's ceramic material" and the "density of the proppant's ceramic material" all refer to the true density of the solid ceramic matrix that forms the ceramic particle. As defined in the Dictionary of Ceramics, third edition, by Arthur Dodd and David Murfin, the true density of a porous solid is "defined as the ratio of the mass of the material to its true volume" which is then "defined as the volume of the solid material only, the volume of any pores being neglected." A ceramic material's true density is characteristic of the ceramic material's chemical composition and crystalline phase(s). The true density of the ceramic material is independent of the particle's porosity. The density of the proppant's ceramic material is determined according to ASTM Standard D02840-69 by weighing a sample, grinding the sample to less than 100 mesh, measuring the volume of the sample with a helium pycnometer (such as an SPY 03 Quantachrome stereopycnometer) and calculating the weight per cubic centimeter.

The ceramic material's density is a physical parameter that is distinct and separate from the particle's specific gravity. In contrast to the definition of density provided above, the phrases "specific gravity of the ceramic particle" and "specific gravity of the proppant" both refer to the particle's apparent specific gravity which is defined in the *Dictionary of Ceramics* as "the ratio of the mass to the mass of a quantity of water that, at 4° C., has a volume equal to the apparent solid volume of the material at the temperature of measurement." For use herein the apparent solid volume is defined as the volume of the solid material plus the volume of any sealed pores. The specific gravity of the ceramic particle is directly impacted by the porosity incorporated into the particle. The porosity of the ceramic particles of this invention may range from 2 percent to 40 percent. Ceramic particles having porosity between 5 and 15 percent are feasible. The specific gravity of the ceramic particle may be determined using International Standard ISO 13503-2. The standard issued Nov. 1, 2006.

Apparent porosity in a ceramic body is defined as 1 minus the quotient of the apparent specific gravity divided by the true density.

The true density of the ceramic material and the specific gravity of the ceramic particle can be controlled independently. For example, while holding the true density of the ceramic material constant, ceramic particles having different levels of porosity incorporated therein could be manufactured thereby resulting in ceramic particles having the same true density but different specific gravities. Similarly, while holding the level of porosity in several ceramic particles the same, the compositions of the ceramic materials used to make the particles can be changed thereby resulting in particles having the same porosity but different true densities.

Using the teachings provided herein, a proppant having a low specific gravity and high crush resistance can be made. The proppant may be made from a high density material, such as ceramic material having a true density greater than 3.5 g/cc, while the proppant may have a low specific gravity, such as 2.8, due to the incorporation of pores in the proppant. Proppants that have even lower specific gravity, such as 2.5, 2.4 or 2.0 are feasible. Because high density ceramic material may have high strength and are therefore resistant to crushing, high density ceramic materials may be desirable. However, proppants made from high true density materials may tend to prematurely settle out in a fracturing fluid when inserted in a well bore if the proppant's specific gravity is approximately equal to the ceramic material's true density. Proppants having good crush resistance and low specific gravity can be attained if the true density of the ceramic material is high enough to increase the crush resistance beyond the decrease in crush resistance caused by the incorporation of pores needed to lower the specific gravity of the proppant.

Shown in FIG. 1 is a ternary diagram 10 of a sintered ceramic particle that includes $Al_2O_3$, $Fe_2O_3$ and $SiO_2$ and assumes no porosity, Lines 12, 14 and 16 represent the true densities of the ceramic particles at 3.0 g/cc, 3.2 g/cc and 3.4 g/cc, respectively. Other lines that are generally parallel to lines 12, 14 and 16 indicate the true densities of the ceramic particles as marked on the phase diagram. On this graph, the lowest density is approximately 2.7 g/cc and the highest density is approximately 4.2 g/cc. Hatched area 18 identifies the portion of the diagram that contains no more than 30 weight percent $SiO_2$, 15 to 40 weight percent oxides of iron and the density of the ceramic material is 3.5 g/cc or higher. Proppants that fall within the hatched area have been found to have good crush resistance when evaluated for crush resistance at 137.9 megapascals (MPa) which is equivalent to 20,000 psi.

Figure 2:
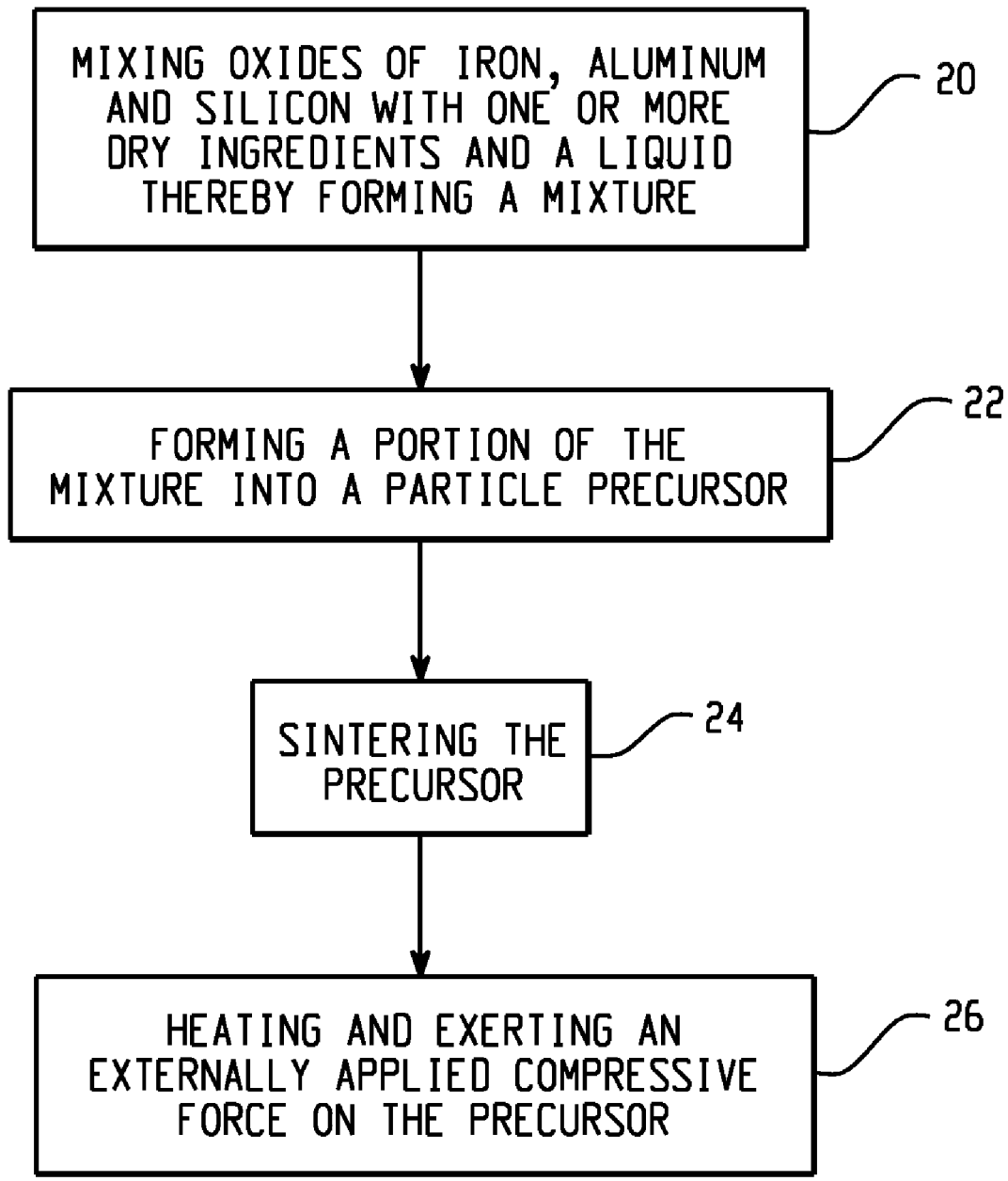
FIG. 2 is a flow chart of a process used to manufacture a ceramic particle.

Shown in FIG. 2 is a flow chart of a process used to make a sintered ceramic particle of this invention. Step 20 represents mixing bauxite ore with dry ingredients, such as binders and pore formers, and liquids, such as water, to form a free flowing powder which may be referred to herein as a mixture. A binder may be one or more materials selected from organic starches, such as drilling starch, as well as gums or resins that are sold commercially for such purposes. A binder may also be an inorganic material such as clay or an acid. Binders are usually added in an amount less than 10 weight percent of the dry solid content of the mix and may be added dry or as a solution. In step 22, the mixture may be processed through a machine such as an Eirich RO2 mixer, thereby forming at least a portion of the mixture into a large number of small spheres that may be referred to herein as particle precursors or proppant precursors. Particle precursors that are useful as proppants may be processed through a screening apparatus that includes a No. 8 ASTM sieve designation, which has 2.36 mm apertures, and a No. 70 ASTM sieve designation, which has 212 μm sieve apertures. The proppants flow through the No. 8 sieve and do not flow through the No. 70 sieve. Step 24 represents sintering the precursors to improve the physical integrity of the precursors relative to the physical integrity of the precursors prior to heating. In step 26 the particle precursors may be heated and an externally applied compressive force exerted on the precursor thereby producing a plurality of sintered particles. Due to shrinkage which may occur during the sintering process, the average diameter of the sintered particles may be less than the average diameter of the particle precursor.

Commercial processes used to manufacture proppants typically use a kiln to sinter the proppant greenware at atmospheric pressure. The kiln may be a tubularly shaped rotating kiln that allows proppants to tumble as they move from one end of the kiln to the opposite end of the kiln. The maximum temperature in a kiln used to make proppants comprising primarily alumina may approach 1500° C. In contrast to manufacturing proppants at atmospheric pressure, proppants with improved crush resistance may be manufactured by exerting an externally applied compressive force on the proppant during the proppant manufacturing process. The externally applied compressive force may be any force that uniformly compresses the proppant from all directions toward the center of the proppant. An example of a suitable compressive technique is isostatic pressing. A specific embodiment of isostatic pressing is hot isostatic pressing which utilizes heated gas to elevate the temperature of the particle, so that complete or partial sintering of the ceramic material can take place, and simultaneously exerting a force inwardly against all points of the particle's surface. Isostatic pressing may use a flexible rubber or elastomer container, commonly known as "tooling", into which the article to be pressed is inserted. The tooling is then placed into a vessel containing hydraulic fluid. Hydrostatic pressure is then applied to the fluid. The process applies pressure in a uniform manner over the entire surface of the article resulting in the article having uniform density. An alternate approach is to sequentially sinter and compress the articles. In one embodiment, the articles, such as proppant precursors, are sintered and then hot isostatic pressing is used to apply pressure to all surfaces of the proppants. The sintering step improves the physical integrity of the proppants. Bauxite based proppants may be sintered between 1100° C. and 1500° C. Another alternate approach is to use isostatic pressing to exert a compressive force on the proppant precursors and then sinter the compressed particles.

EXAMPLES

To demonstrate the improved crush resistance of proppants of this invention, five lots of proppants, identified herein as Lots A, B, C, D and E, were made and evaluated for crush resistance. The raw materials used to make the proppants are shown in Table 1. Lot A represents commercially available proppants that contained 9.5 weight percent oxides of iron in the sintered proppant. Lots B, C, D and E represent proppants having at least 15 weight percent oxides of iron, calculated as $Fe_2O_3$ in the sintered proppant. A commercially available source of bauxite is available from Ferrous American Company of Littleton, Colo., USA. A quantity of bauxite from this company was used to manufacture Lots B, C, D and E. The composition of this bauxite included 64.0 weight percent $Al_2O_3$, 25.8 weight percent $Fe_2O_3$ and 4.0 weight percent $SiO_2$. The are also contained 3.2 weight percent $TiO_2$ and trace amounts, which is defined herein as less than 1 weight percent, of several other compounds such as MgO, CaO, $CeO_2$, and MnO. Lots A, B, C, D and E were made using a conventional proppant manufacturing process to form a plurality of small spheres known herein as proppant precursors or particle precursors. The process utilized an RV02 high-intensity shear mixer available from Eirich Machines, Inc. of Gurnee, Ill., USA. The process included disposing the initial charge of bauxite into the mixer with both the pan and rotor rotating. The rotor speed was set at 80 percent of maximum speed. After 30 seconds, the deionized water was poured into the mixer directly onto the rotating bauxite. Approximately 30 seconds was used to distribute the water onto the bauxite. The moistened bauxite was allowed to rotate for three minutes during which time a plurality of spheres were formed. The rotor speed was then reduced to minimum speed as the pan continued to rotate. The second charge of bauxite was then added slowly to the rotating spheres of bauxite. The slow addition of bauxite took approximately three minutes and may be referred to as "dusting in" the bauxite. After completing the dusting in of the bauxite, the pan continued to rotate for approximately 20 seconds. The spheres of bauxite that had been coated with a layer of bauxite were removed from the mixer and may be referred to herein as proppant precursors or particle precursors. The precursors in lots A, B, C and D were then sintered in a rotating kiln at atmospheric pressure. Only the precursors in lot E were made with a process that included the exertion of an externally applied compressive force on the proppant precursor. The technique used to exert the externally applied compressive force is known as hot isostatic compression. The particle precursors in Lot E were sintered at 1250° C. The sintered precursors were then simultaneously pressed at 352 kg/cm² (5,000 psi) and heated to 1200° C. for one hour. Heating the sintered precursors to 1200° C. while exerting the compressive force helped to prevent grain growth during the compression step. For lots A, B and C, screening was used to limit the particle size to those particles that passed through a screen having 20 mesh openings and did not pass through a screen having 40 mesh openings. Lots D and E were screened to limit the particle sizes to those particles that passed through a screen having 30 mesh openings and did not pass through a screen having 50 mesh openings.

TABLE 1

| Ingredient | Oxides of Iron | A | B | C | D | E* |
|---|---|---|---|---|---|---|
| Bauxite (first charge) | Iron oxide greater than 15 wt % |  | 57.12% | 57.12% | 57.12% | 57.12% |
|  | Iron oxide less than 15 wt % | 57.12% |  |  |  |  |
| Drilling Starch |  | 1.14% | 1.14% | 1.14% | 1.14% | 1.14% |
| Deionized Water |  | 27.42% | 27.42% | 27.42% | 27.42% | 27.42% |
| Bauxite (second charge) | Iron oxide greater than 15 wt % |  | 14.28% | 14.28% | 14.28% | 14.28% |

TABLE 1-continued

| Ingredient | Oxides of Iron | A | B | C | D | E* |
|---|---|---|---|---|---|---|
|  | Iron oxide less than 15 wt % | 14.28% |  |  |  |  |
| Proppants' Particle Size Distribution |  | 20/40 | 20/40 | 20/40 | 30/50 | 30/50 |

*Precursors were sintered and then compressed using hot isostatic compression

Figure 3:
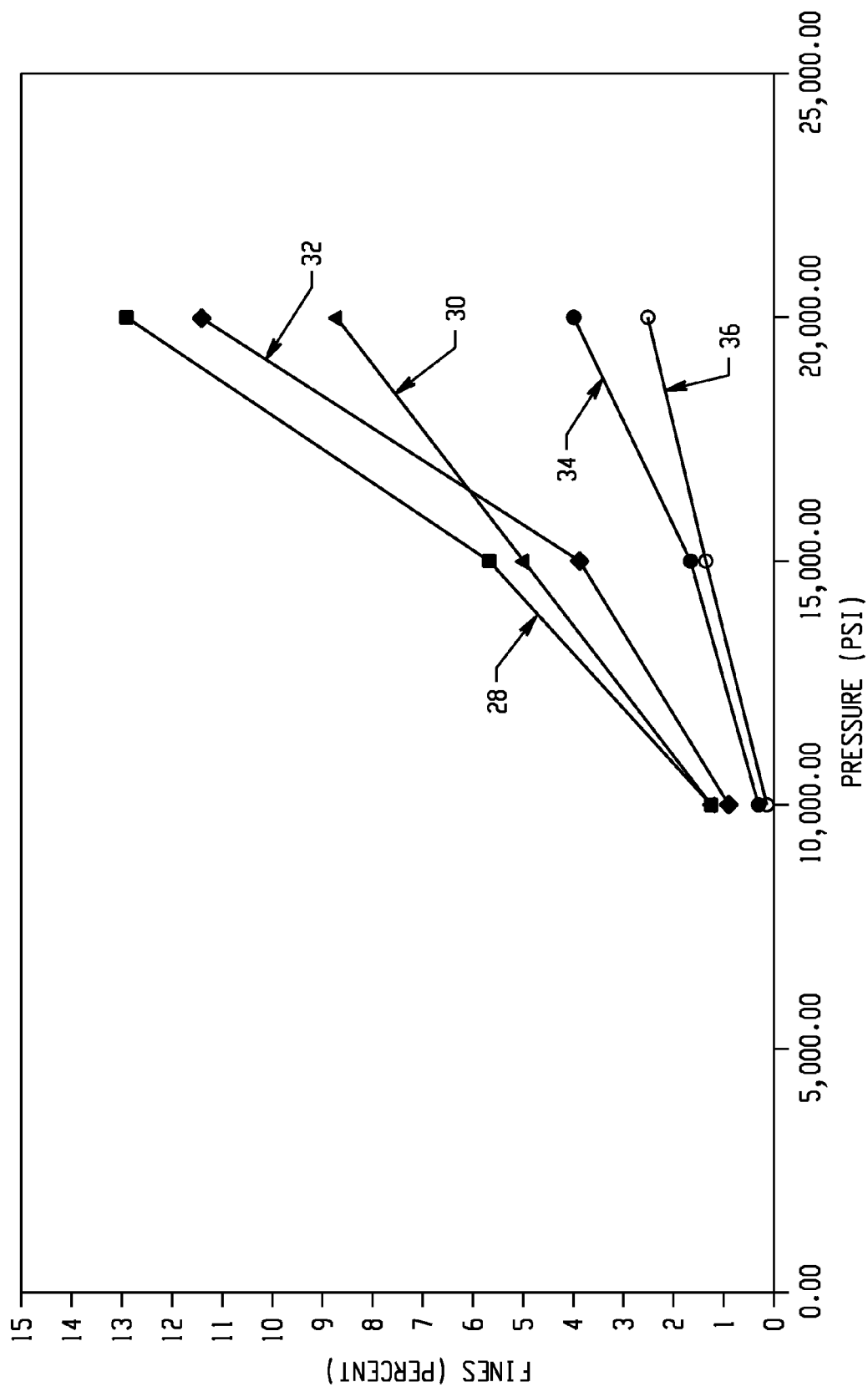
FIG. 3 is a line chart which shows crush resistance by plotting percentage of fines versus pressure.

FIG. 3 is a line plot of crush resistance versus pressure for lots A, B, C, D and E. Line 28 (Lot A) represents the crush resistance of a commercially available sintered bauxite that contained 9.5 weight percent oxides of iron calculated as $Fe_2O_3$. After exposure to 86.2 MPa (12,500 psi), approximately 5.5 weight percent of the proppant had been crushed to fines. Line 30 (Lot B) and line 32 (Lot C) represent the crush resistance of duplicate runs of a proppant that to had 25.8 weight percent oxides of iron calculated as $Fe_2O_3$ and a 20/40 particle size. At 103 MPa (15,000 psi), an average of 4.5 weight percent of this proppant had been crushed to fines which is better than the crush resistance of the commercially available proppant at 86.2 MPa (12,500 psi) (see line 28). Line 34 (Lot D) and line 36 (Lot E) represent the crush resistance of a proppant that had 25.8 weight percent oxides of iron calculated as $Fe_2O_3$ and 30/50 particle size. At 137.9 MPa (20,000 psi), the average crush resistance of the proppants in lots D and E was approximately 3.5 percent which is much better than the crush resistance of the proppants that contained less than 15 weight percent iron oxide at 86.2 MPa (12,500 psi) (see line 28). The data demonstrates that the proppants made with more than 15 weight percent oxides of iron (lots B, C, D and E) had better crush resistance than the proppants in lot A that had less than 15 weight percent oxides of iron. Furthermore, the proppants in Lot E provided the best crush resistance.

The above description is considered that of particular embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law.

What is claimed is:

1. A sintered particle comprising ceramic material, wherein said ceramic material comprises oxides of aluminum, iron and silicon; said oxides of silicon, calculated as $SiO_2$, represent no more than 30 weight percent of said oxides' combined weight; said oxides of iron, calculated as $Fe_2O_3$, represent between 20 and 40 weight percent of said oxides' combined weight; and said ceramic material's true density exceeds 3.5 g/cc.

2. The sintered particle of claim 1 wherein the combined weight of said oxides exceeds 50 weight percent of said ceramic particle's total weight.

3. The sintered particle of claim 1 wherein said oxides of iron represent between 20 and 35 weight percent of said oxides' combined weight.

4. The sintered particle of claim 1 wherein said oxides of iron represent between 20 and 30 weight percent of said oxides' combined weight.

5. The sintered particle of claim 1 wherein said oxides of aluminum, calculated as $Al_2O_3$, represent between 50 and 85 weight percent of said oxides' combined weight.

6. The sintered particle of claim 5 wherein said oxides of aluminum represent between 60 and 80 weight percent of said oxides' combined weight.

7. The sintered particle of claim 1 wherein said oxides of silicon, calculated as $SiO_2$, represent between 1 and 10 weight percent of said oxides' combined weight.

8. A sintered particle comprising ceramic material, wherein said ceramic material comprises oxides of aluminum, iron and silicon; said oxides of silicon, calculated as $SiO_2$, represent no more than 30 weight percent of said oxides' combined weight; said oxides of iron, calculated as $Fe_2O_3$, represent between 15 and 40 weight percent of said oxides' combined weight; and said ceramic material's true density exceeds 4.0 g/cc.

9. The sintered particle of claim 8 wherein said ceramic material's true density exceeds 4.5 g/cc.

* * * * *